United States Patent [19]

Rodda et al.

[11] Patent Number: 5,441,585

[45] Date of Patent: Aug. 15, 1995

[54] METHOD OF MAKING A PATTERN FROM A BLEND OF WATER, PLASTER OF PARIS AND POLYVINYL ACETATE

[75] Inventors: Philip A. Rodda, Sun River; Alan L. Earnest, Culver, both of Oreg.

[73] Assignee: The Confederated Tribes of Warm Springs Reservation, Warm Springs, Oreg.

[21] Appl. No.: 240,143

[22] Filed: May 10, 1994

[51] Int. Cl.$^6$ ............... B29C 37/00; C04B 24/24
[52] U.S. Cl. ................... 156/256; 106/778; 264/86; 264/138
[58] Field of Search ........... 106/778; 264/135, 152, 264/162, 86, 333; 156/264, 71, 153, 256

[56] References Cited

U.S. PATENT DOCUMENTS

| | | | |
|---|---|---|---|
| 3,941,632 | 3/1976 | Swedenberg et al. | 156/71 |
| 3,980,487 | 9/1976 | Akabayashi et al. | 106/648 |
| 4,117,183 | 9/1978 | Long | 156/39 |
| 4,174,230 | 11/1979 | Hashimoto et al. | 106/780 |
| 4,372,814 | 2/1983 | Johnstone et al. | 162/129 |
| 4,883,621 | 11/1989 | Natori et al. | 264/86 |
| 5,009,269 | 4/1991 | Moran et al. | 106/778 |
| 5,098,943 | 3/1992 | Tagawa et al. | 524/423 |

FOREIGN PATENT DOCUMENTS

| | | | |
|---|---|---|---|
| 2927785 | 2/1981 | Germany | 106/778 |
| 53-144924 | 12/1978 | Japan | 264/86 |

*Primary Examiner*—Jay H. Woo
*Assistant Examiner*—Robert B. Davis
*Attorney, Agent, or Firm*—Kolisch, Hartwell, Dickinson, McCormack & Heuser

[57] ABSTRACT

A machinable plaster prepared from a blend of water, plaster of paris and polyvinyl acetate. Making a pattern where the blend is poured into a form, and after solidification is cut to produce the pattern. The machinable plaster does not dust when cut, and can withstand moderate temperatures without softening.

5 Claims, No Drawings

METHOD OF MAKING A PATTERN FROM A BLEND OF WATER, PLASTER OF PARIS AND POLYVINYL ACETATE

BACKGROUND AND SUMMARY OF THE INVENTION

This invention relates to the making of a pattern from machinable plaster. The invention concerns machinable plaster compositions, a method of preparing the compositions, and a method of preparing a pattern from a mass of machinable plaster.

In the making of a shaped article, it is common to prepare a pattern for the article from a mass of machinable plaster, with cutting of the mass of machinable plaster to produce shaping of the mass. Cutting is done with a cutting tool, such as a saw, or lathe cutting tool, with removed material removed in the form of chips.

It is important that the mass of machinable plaster be easily machined with the production of a very smooth surface. The machinable plaster should not be abrasive, so as to minimize tool wear. The plaster should not dust when machined, with material on its removal being cut and in the form of chips. Minimal friction should result between the cutting tool and the plaster to prevent the plaster from softening when machined. In this connection, a mass of machinable plaster usually is not sanded when shaped, as this results in the production of dust and undesirable softening in the plaster mass.

Optimally, pattern material or machinable plaster should withstand a moderate low temperature without softening or deterioration (240° F.). Drying of any water-based plaster-forming composition from which a mass of machinable plaster is prepared should occur without shrinkage. The machinable plaster should be based on non-toxic ingredients. Economies of manufacture require that the raw ingredients of any machinable plaster be readily available and inexpensive.

Generally, an object of this invention is to provide a machinable plaster which is mildly heat resistant and machinable to exacting tolerances, and that will not dust when sawn or machined.

Another object is to provide such a machinable plaster which is relatively inexpensive, which is environmentally friendly, and which does not contain toxic ingredients possibly posing health risk to those who work with the material.

The machinable plaster or pattern material of the invention may be produced from a liquid, water-based plaster-forming composition which is a blend of plaster of paris, polyvinyl acetate, and water. The materials just described are relatively inexpensive and readily available. The materials are easily blended together when slowly mixed and without the capture of air, i.e., bubbles, into the blend. When poured into a mold, and on setting and hardening, the plaster-forming compositions produce smooth-surfaced products closely conforming to the shape of the mold used.

Among the further objects of the invention is the provision of a liquid, plaster-forming composition for making a mass of machinable plaster, which may be poured into a form having one or more smooth flat faces, with the production on setting or hardening of a solid product surfaced by a face closely conforming to the face of the form used. The user may adhere or glue together several pieces of hardened product through flat faces which bound the product. A composite product may be so produced, without any gaps or pockets existing between the adhered pieces. The composite product may, if desired, be machined to produce a cut shape conforming to the one desired.

Because the liquid plaster-forming compositions may be used to produce a smooth surfaced product closely conforming to the shape of the form used in making the product, shaped products may be prepared with surfaces that do not need to be sanded to have the smoothness desired.

The aforementioned objects and other objects and advantages are attained by the invention, which is described hereinbelow in greater detail, and with reference to specific examples.

In general terms, machinable plaster or pattern material as contemplated herein is prepared from a water-based plaster-forming composition which is free of abrasive material and which comprises, in addition to water, and as active ingredients, essentially a mixture of plaster of paris and polyvinyl acetate.

Plaster of paris, or casting plaster, is a hemi-hydrated calcium sulfate compound containing one-half mole of water for each mole of calcium sulfate in the compound. The compound readily combines with additional water to form a fully hydrated product or gypsum. In the proportions contemplated in the plaster-forming compositions of the instant invention, the material is relatively non-abrasive.

Polyvinyl acetate is a water-emulsifiable organic polymer, serving as a binder for the plaster of paris. In preparing the plaster-forming compositions of the invention, a polyvinyl acetate emulsion normally might be employed, containing about 10 parts polyvinyl acetate and one part water in the emulsion. As used throughout this disclosure, when parts are referred to, such refer to parts on a by weight basis.

A pouring composition is prepared by slowly mixing together plaster of paris and water, to produce hydration of the plaster of paris. Mixing is done slowly, to prevent the pulling of air in the form of bubbles into the mix, i.e., the capture of such air. While mixing, polyvinyl acetate emulsion as described above may also be slowly added, to produce a thoroughly mixed blend of the plaster of paris, water and polyvinyl acetate.

Best results are obtained from plaster-forming compositions containing, for each 100 parts active ingredients, from 30 to 50 parts water. The term "active ingredients" refers to the non-water portion of the plaster-forming composition. The plaster of paris may range from about 50% to 70% by weight of the active ingredient portion, with the remainder, or from 30% to 50% by weight of such portion, being polyvinyl acetate. With an amount of polyvinyl acetate used in excess of the range indicated, a machinable plaster results which is more sensitive to tool friction heat, as evidenced by increased tendency to soften at an elevated temperature. With a proportion of plaster of paris used which exceeds the range indicated, a machinable plaster is produced which tends to become slightly more abrasive and thus damaging to the cutting tools used.

Pouring compositions as indicated are poured into a form with pouring performed slowly to prevent any air from being pulled into the mixture and the formation of bubbles. After pouring into a form :has been performed, hardening or set up of a poured material will normally occur in about 15 to 30 minutes. The set product may then be removed from the form and dried in a low heat environment with air movement to promote drying.

Drying normally is performed at relatively low temperatures, i.e., temperatures not exceeding about 120° F., to prevent deformation or distortion from occurring in the poured product.

If the plaster-forming composition is poured into a form having upright, smooth-surfaced planar walls, the set product which is prepared from the form will have conforming smooth surface planar walls which are smooth without the need for sanding. As a consequence, two pieces of pattern board so prepared may be adhered together, with bonding of confronting planar faces, to produce a composite product from the two pattern board pieces without any gaps in the interface where the two pieces are joined together.

Pattern material or machinable plaster produced as contemplated may be cut with a cutting tool, such as a saw or cutter in a lathe, to produce further shaping as desired. When cut, unwanted material is removed as cut chips rather than dust, which is highly desirable. Further, cutting may be performed without the build up of heat in the surface of the machinable plaster. Cutting is performable without raising the temperature of the material to the 240° F. level where undesirable softening might start to occur. In this connection, the machinable plaster of the invention is not shaped with sanding (defined in the usual sense as repeated motion with an abrasive material over the same region), as such tends to produce undesirable elevated temperature in the surface of the material treated.

Describing a particular example, 60 parts plaster of paris were slowly mixed with 40 parts of water to produce hydration of the plaster of paris. During this mixing, 42 parts of polyvinyl acetate emulsion (92% PVA) were introduced to the mix. Mixing was continued until the blend had a uniform color and consistency. The plaster-forming composition so produced was then poured into a form having opposite parallel flat and smooth faces, to produce a pattern board from the pouring composition. Set up of the poured mixture occurred in about 20 minutes. After set up, the product was removed from the form and dried at a temperature of about 120° F. with air movement to accelerate the drying.

The dried product produced had smooth flat faces, produced without the necessity of sanding. The product could be shaped with cutting, as with a saw, without the production of dust.

Pieces of pattern board so produced could be glued or adhered together through their flat faces to produce a composite product comprising a lamination of the two pieces. The composite product was devoid of gaps between the two pieces.

An advantage of the machinable plaster or pattern material produced by the invention is that it has relatively light density. The product produced as described above had a density of approximately 55 pounds per-cubic-foot.

While a particular embodiment of the invention has been described, it should be obvious that variations and modifications are possible without departing from the invention.

It is claimed and desired to secure by letters patent:

1. In the making of a pattern, the method comprising:
preparing a blend of water, from 50 to 70 parts by weight plaster of paris and from 30 to 50 parts by weight polyvinyl acetate,
pouring said blend into a form such that the pouring is done without the capture of air into the blend,
allowing said blend to set up with solidification in said form to produce a solid product,
removing the product from the form, and
cutting said product with a cutting tool, wherein the tool removes the product in chip form, to shape the product and produce the pattern.

2. In the making of a pattern, the method comprising:
preparing a blend of water, from 50 to 70 parts by weight plaster of paris and from 30 to 50 parts by weight polyvinyl acetate,
pouring said blend into a form such that the pouring is done without the capture of air into said blend, and allowing the blend to set up in said form to produce a solid product,
said form having an upright smooth planar face and said setting up resulting in a solid product having a smooth planar face conforming to the planar face of the form, and
adhering said solid product against another solid product having a smooth planar face produced according to the preceding steps, and with the planar faces of the respective products against each other to produce a composite product, and cutting the composite product to produce the pattern.

3. In the making of a pattern, the method comprising:
preparing a blend of water, from 50 to 70 parts by weight plaster of paris, and from 30 to 50 parts by weight polyvinyl acetate, pouring said blend into a form such that the pouring is done without the capture of air into said blend,
allowing said blend to set up with solidification in said form to produce a solid product, said form having an upright smooth flat face and setting up occurring with said product having a smooth flat face conforming to the flat face of the form,
adhering said product against another product having a smooth flat face produced according to the preceding steps and with the planar faces of the respective products against each other to produce a composite product, and
cutting said composite product with a cutting tool to shape the composite product and with the removal of material by the cutting tool in chip form.

4. A method of preparing a pattern comprising:
preparing a blend of plaster of paris and a polyvinyl acetate and water by mixing the plaster of paris and water to produce hydration of the plaster of paris and by mixing polyvinyl acetate with the plaster of paris and water, the blend containing from 30 to 50 parts by weight water and 100 parts by weight of a polyvinyl acetate and plaster of paris portion, with the plaster of paris making up from 50% to 70% of said portion and the remainder of said portion being essentially polyvinyl acetate,
pouring said blend into a form such that the pouring is gone without the capture of air into said blend and allowing the blend to set up in said form to produce a solid product, said form having an upright planar face and said setting up occurring to produce a solid product having a planar face conforming to the planar face of the form,
adhering said product against another product having a planar face produced according to the preceding steps and with the planar faces of the respective products against each other to produce a composite product, and
cutting said composite product to produce the pattern therefrom with cutting being done with a cutting tool and the removal of material in chip form and with the cutting shaping the product into the pattern.

5. The method of claim 1 wherein the blend is poured into a form having an upright planar face, and after removal from the form, a laminate is prepared through said face.

* * * * *